US011772814B2

(12) United States Patent
Dubois et al.

(10) Patent No.: US 11,772,814 B2
(45) Date of Patent: Oct. 3, 2023

(54) SYSTEM INCLUDING A DRONE, A WIRE, AND A DOCKING STATION, ENABLING AUTONOMOUS LANDINGS OF THE DRONES IN DEGRADED CONDITIONS

(71) Applicant: ELISTAIR, Champagne Au Mont D'Or (FR)

(72) Inventors: Olivier Dubois, Lyons (FR); Timothée Penet, Lyons (FR); Guilhem De Marliave, Lyons (FR)

(73) Assignee: ELISTAIR, Champagne Au Mont D'Or (FR)

( * ) Notice: Subject to any disclaimer, the term of this patent is extended or adjusted under 35 U.S.C. 154(b) by 852 days.

(21) Appl. No.: 16/465,910

(22) PCT Filed: Dec. 19, 2017

(86) PCT No.: PCT/IB2017/058104
§ 371 (c)(1),
(2) Date: May 31, 2019

(87) PCT Pub. No.: WO2018/100564
PCT Pub. Date: Jun. 7, 2018

(65) Prior Publication Data
US 2020/0070999 A1    Mar. 5, 2020

(30) Foreign Application Priority Data

Dec. 2, 2016   (FR) ..................................... 16/70732

(51) Int. Cl.
*B64U 70/97*   (2023.01)
*B64D 45/04*   (2006.01)
(Continued)

(52) U.S. Cl.
CPC ............. *B64D 45/04* (2013.01); *B64C 39/024* (2013.01); *B64D 17/62* (2013.01); *B64U 70/95* (2023.01); *B64U 70/97* (2023.01); *B64U 70/83* (2023.01)

(58) Field of Classification Search
CPC ... B64B 1/50; B64C 39/022; B64C 2201/148; B64F 1/029; B64F 3/00; B64F 3/02;
(Continued)

(56) References Cited

U.S. PATENT DOCUMENTS 3,217,097 A * 11/1965 Pauli ..................... B64C 39/022
                                                              348/E7.087
4,004,759 A    1/1977 Hund
(Continued)

FOREIGN PATENT DOCUMENTS

BE           584175 A       2/1960
CN       106081144 A    * 11/2016
(Continued)

OTHER PUBLICATIONS

English Translation of Written Opinion for Application PCT/IB/2017/058104 (Year: 2018).*

(Continued)

*Primary Examiner* — Christopher D Hutchens
*Assistant Examiner* — Michael A. Fabula
(74) *Attorney, Agent, or Firm* — CANTOR COLBURN LLP

(57) ABSTRACT

A system including a drone, a wire and a docking station allowing the autonomous landing of the drone in degraded conditions. The docking station including a landing platform. The landing procedure includes stopping the automatic position control of the drone, producing a motor thrust higher than the weight of the drone, the automatic control of the attitude of the drone, and pulling upon the wire in order (Continued)

to bring the drone back to the platform. This system makes emergency landings possible, or landings under violent winds, or when the docking station is in movement on a vehicle, reducing material breakage.

8 Claims, 2 Drawing Sheets

(51) Int. Cl.
   *B64C 39/02* (2023.01)
   *B64D 17/62* (2006.01)
   *B64U 70/95* (2023.01)
   *B64U 70/83* (2023.01)

(58) Field of Classification Search
   CPC . B64F 1/00; B64F 1/007; B64U 70/00; B64U 70/30; B64U 70/83; B64U 70/87; B64U 70/90; B64U 70/92; B64U 70/93; B64U 70/95; B64U 70/97
   See application file for complete search history.

(56) References Cited

U.S. PATENT DOCUMENTS

| | | | |
|---|---|---|---|
| 8,350,403 B2* | 1/2013 | Carroll | F03D 9/255 290/55 |
| 8,590,829 B2* | 11/2013 | Keidar | B64C 39/024 244/17.11 |
| 9,139,310 B1 | 9/2015 | Wang | |
| 9,637,245 B2* | 5/2017 | Yoffe | B64F 1/0297 |
| 10,274,952 B2* | 4/2019 | Cantrell | G08G 5/0008 |
| 2003/0057327 A1* | 3/2003 | Carroll | F02B 75/34 244/139 |
| 2011/0174925 A1* | 7/2011 | Ying | B64F 1/005 701/16 |
| 2012/0091258 A1* | 4/2012 | Keidar | B64C 39/022 244/17.11 |
| 2013/0233964 A1* | 9/2013 | Woodworth | B64C 25/58 244/175 |
| 2013/0313364 A1 | 11/2013 | Shachor et al. | |
| 2016/0001883 A1 | 1/2016 | Sanz et al. | |
| 2016/0144982 A1 | 5/2016 | Sugumaran | |
| 2016/0340049 A1* | 11/2016 | Ferreyra | B64D 17/80 |
| 2017/0129603 A1* | 5/2017 | Raptopoulos | G08G 5/0069 |
| 2017/0158338 A1* | 6/2017 | Sweeny | G05D 1/105 |
| 2017/0166327 A1* | 6/2017 | Schmidt | B64F 1/007 |
| 2019/0217968 A1* | 7/2019 | Schmidt | B64F 1/007 |

FOREIGN PATENT DOCUMENTS

| | | | | |
|---|---|---|---|---|
| CN | 108016629 A | * | 5/2018 | B64F 1/00 |
| CN | 108698710 A | * | 10/2018 | B64C 39/024 |
| EP | 0661206 A1 | | 7/1995 | |
| EP | 2218642 A2 | | 8/2010 | |
| EP | 2899128 A1 | | 7/2015 | |
| EP | 3056435 B1 | | 7/2019 | |
| FR | 2264714 | | 10/1975 | |
| FR | WO-9200876 A1 | * | 5/1991 | |
| FR | 2701919 A1 | | 9/1994 | |
| GB | 1459057 | | 12/1976 | |
| WO | 2007141795 A1 | | 12/2007 | |
| WO | 2010092253 A1 | | 8/2010 | |
| WO | 2016125142 A1 | | 8/2016 | |

OTHER PUBLICATIONS

English Machine Translation to Abstract of EP2899128.
International Search Report for Application No. PCT/IB2017/058104.
Written Opinion for Application No. PCT/IB2017/058104.
Communication pursuant to Rule 94(3) (non-English) dated Apr. 8, 2021; EP Application No. 17829705.7; 2 pages.
Search Report dated Jul. 19, 2017; FR Application No. 1670732; 4 pages.
Written Opinion (non-English) dated Jul. 19, 2017; FR Application No. 1670732; 6 pages.

* cited by examiner

SYSTEM INCLUDING A DRONE, A WIRE, AND A DOCKING STATION, ENABLING AUTONOMOUS LANDINGS OF THE DRONES IN DEGRADED CONDITIONS

CROSS REFERENCE TO RELATED APPLICATIONS

This application is a National Stage of PCT Application No. PCT/IB2017/058104 filed on Dec. 19, 2017 which claims priority to French Patent Application No. 16/70732 filed on Dec. 2, 2016, the contents each of which are incorporated herein by reference thereto.

TECHNICAL FIELD OF THE INVENTION

The invention concerns a system including a drone, a wire, and a docking station, the system being especially adapted to enable autonomous landings of the drone in degraded condition.

The drones concerned by the invention are all flying machines called rotary wing flying machines, and remotely piloted by means of a control device. The rotary wing drones comprise all known kinds of scale model helicopters.

A docking station refers to any device on the ground or on a vehicle intended to dock the drone before and after its mission in the air. In general, a docking station includes at least one landing platform, which also serves as a take-off platform for the drone.

The wire that is considered above links the drone to the docking station. This wire often ensures at least the electrical power supply of the drone.

The degraded landing conditions for which the system is provided may be in particular:
 a violent wind,
 a docking station in movement on a vehicle such as a rocking boat or a moving car,
 the loss of important members for the drone to continue a normal flight such as for example the loss of an attitude sensor or a drive motor of a lift propeller.

BACKGROUND

The use of remotely piloted drones is widespread.

It is known to use drones having automatic landing procedures. For example, some commercial drones automatically return to their take-off point when the user initiates the landing procedure. Other procedures provide, when the user initiates the landing procedure, for a simple vertical landing right above the location of the drone at the time when the procedure was initiated, the landing speed and the stabilization of the drone being automatically controlled by the system without user intervention.

Some commercial drones rely for their automatic landing procedure on an optical positioning, for example by laser or by camera and image recognition, others on ultrasonic sonars. These sensors are also very useful in an indoor flight in a room or in constrained outdoor environments, that is to say with many obstacles.

It is also known to use drone docking stations, whether the drone is wired or not. Here are some examples related to drone docking stations:
 US20160001883 is interested in systems and methods for the autonomous landing of a drone. In particular, this patent describes a landing interface between a drone and a ground station, characterized in that the drone and the ground station have a nesting conical geometry, resulting in an automatic alignment of the drone at the center of the ground station during landing.
 Some ground stations include a system for mechanical repositioning after landing of the drone, including for example two jaws in horizontal translation. These jaws are geometrically designed to recenter each foot of the drone during their horizontal translation. This accurate mechanical repositioning can thereafter enable other subsequent operations such as the replacement of a used battery by a recharged battery at the level of the drone.
 U.S. Pat. No. 9,139,310 describes a docking station of a drone capable of autonomously changing the batteries of the drone. The drone is capable of autonomously landing on this station. The docking station can recharge the used batteries. The docking station can remove the used battery off the drone and provide it with a recharged battery. The drone and the ground station can communicate wirelessly on the states of charge of their respective batteries.
 EP2899128 describes a device for docking a drone on a vehicle and the vehicle associated with this device. The device provides in particular a support intended to support a drone, a means for raising and lowering the support between a low position and a high position, and a system for tying down the drone on the support via a magnetic device.
 WO2010092253 describes a drone provided with a lift propeller, a hull surrounding the propeller and a landing platform. A wire links the landing gear of the drone to the landing platform; this wire allows supplying electrical power to the drone. Some claims describe a form of the platform adapted to the drone; the figures accompanying the patent show a metal basket type platform docking the drone. Other claims relate to the device for positioning the drone with respect to the landing platform. This device measures the inclination of the power supply wire of the drone.

The prior art does not provide a suitable system enabling a landing of a drone in the following situations:
 landing of the drone in high winds,
 landing of the drone when the landing platform is in movement on a land vehicle or on a boat in rough seas,
 emergency landing of the drone in degraded flight condition, such as the loss of a lift rotor or a position sensor,
 rapid landing of the drone if the ground personnel or the drone is targeted by an aggression,
 emergency landing of the drone when a rescue parachute of the drone is open.

In particular, the problems generated by the previous situations are not addressed by any landing system:
 the problem of violent shocks or sudden landings, such shocks can lead to particularly expensive material breakages when the embedded equipment is of a significant value,
 the problem of the landing accuracy, a landing inaccuracy may terminate in the loss of the drone and its embedded equipment.

DISCLOSURE OF THE INVENTION

The invention proposes to describe a system including a drone, a wire, and a docking station.

The system according to the invention overcomes the disadvantages previously listed, it is designed to enable landings:

in heavy wind,
on moving platforms,
in degraded flight conditions of the drone such as the loss of a rotor,
for receiving the drone after opening the emergency parachute,
that are very quick in case of aggression.

The system according to the invention includes at least the following features:
(i) the wire links the drone to the docking station,
(ii) the station includes a frame and a landing platform movable with respect to the frame,
(iii) this mobility is exerted during the landing of the drone,
(iv) this mobility is ensured by a deformable element, either the platform itself, or by a deformable element linking the platform to the frame,
(v) such that under the effect of a shock during landing, the deformable element takes up part of the impact energy.

VARIATIONS OF THE INVENTION

According to variations of the invention:
The possible displacement ensured by the deformable element is larger than or equal to 4 cm.
The deformable element is made with one of the following materials or elements: a stretched canvas, a spring, an elastic band, a cylinder, an active damping cylinder, rubber, foam, air cushions, cushions filled with liquids or gels.
A mechanical brake located on the wire or on a winding drum of the wire keeps the drone pressed on the landing platform during transport of the entire system, and reduces the displacement of the platform-drone set.
The landing platform is raised during landing with respect to the rigid elements of the docking station.
One or several anemometer(s) are present on the drone or the station.
Accelerometers are present on the drone and on the station.
A joystick-type two-crossed-axes sensor fastened between the drone and the wire provides the embedded electronics of the system with information on the relative positioning between the platform and the drone.
The drone includes arms supporting the propellers of the drone. These arms are detachable from the body of the drone. Each arm contains an electrical connector and a mechanical connector, which face an electrical connector and a corresponding mechanical connector on the body of the drone. The mechanical and electrical connectors of the arm of the drone can be combined into one element, as well as those on the body of the drone.
The docking station includes a cowl that can be closed after landing of the drone.
A landing method provides for stopping the motors of the drone in flight, the last step of the landing terminating in a fall.
A pull is exerted on the wire during the landing phase.
The drone includes a parachute and a landing procedure provides, in the presence of certain malfunctions, for the parachute being automatically deployed, the motors being stopped, and a maximum pull being exerted on the wire until the drone is brought back to the landing station. The pull can be exerted by a winding drum of the wire.
For some falls of the drone with the parachute being open, the operational motors are not stopped but used to help the drone fall onto the platform.
A landing procedure provides for: a stoppage of the servo-control of the position of the drone, a thrust of the motors greater than the weight of the drone, a servo-control of the attitude of the drone, a pull on the wire in order to bring the drone back on the platform.
There is a relative positioning device between the drone and the landing platform, the relative positioning system may possibly be made by comparing two absolute positioning devices, one on the drone, and one on the station.
The admissible fall height without breakage for the drone and its payload vertically right above the center of the platform is more than doubled compared to a fall on a hard ground.
A device for recentering the drone once landed involves pulling on the drone via the wire and may also involve vibrations after landing or ON/OFF switchovers of the motors of the drone.
The landing platform has a concave shape, the drone has a landing gear, and this landing gear has a convex shape.
The landing platform has a convex shape, the drone has a landing gear, and this landing gear has a concave shape.
The drone has a landing gear, and this landing gear is provided with damping devices.

PREFERRED EMBODIMENT OF THE INVENTION

Figure 1A:
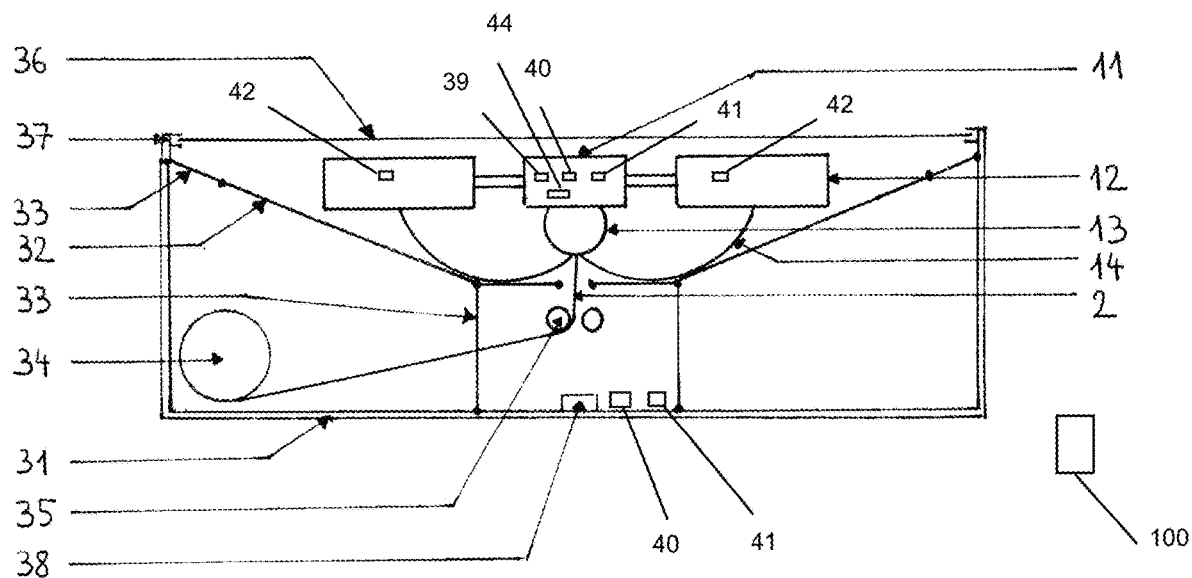
FIG. 1a represents an embodiment of the system according to the invention with the drone (1) in its docking station (3). The drone (1) includes a central body (11) including the embedded electronics, ducted propellers (12), a payload (13), and a landing gear (14) in the form of large arches made of titanium. The drone is attached to the docking station (3) by a wire (2). The docking station (3) includes a frame (31), a landing platform (32), herein a stretched, deformable canvas, attached to the frame (31) by deformable elements (33), herein elastic bands. Guides (35) lead the wire (2) to a winding drum (34) of the wire (2). A GPS sensor (38) is located at the center of the docking station (3). A cowl (36) encloses the docking station (3). During transport, a brake blocks the winding drum (34) of the wire (2), which allows transporting the docking station (3) in all positions without any risk to the drone (1).
Figure 1B:
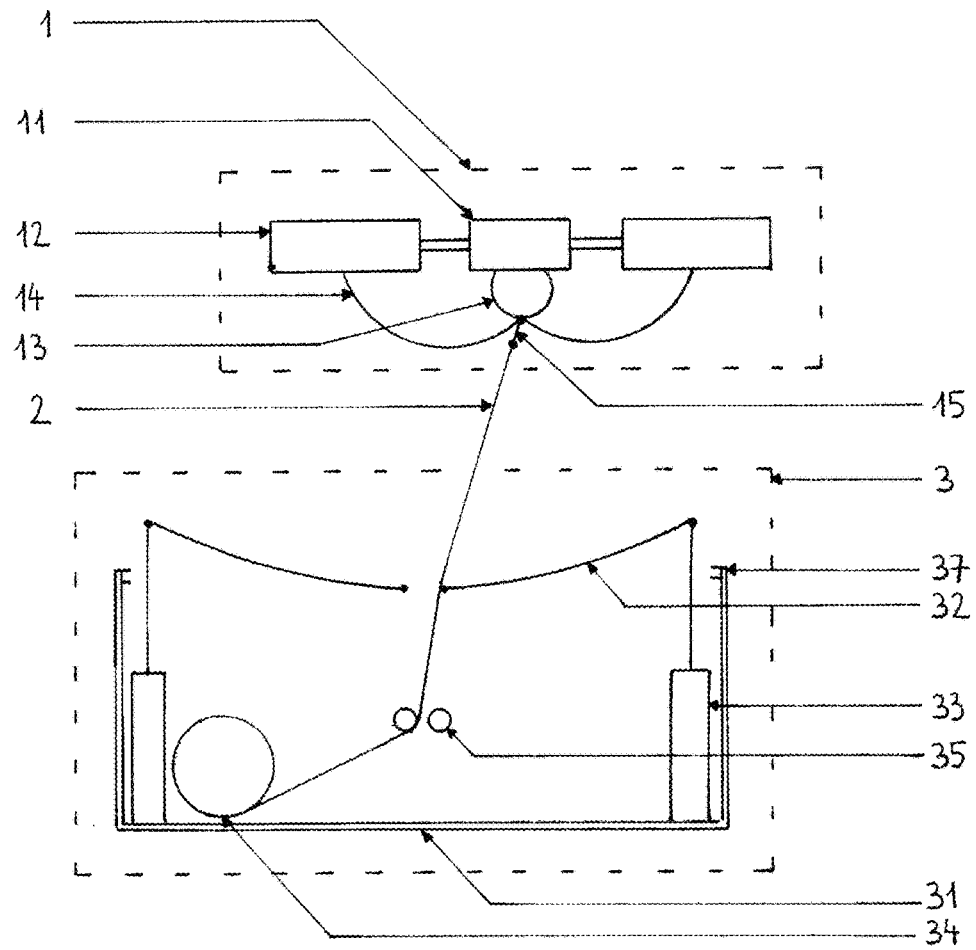
FIG. 1b represents a variant of the embodiment of the previous system, with the drone (1) in flight above the docking station (3). The drone (1) is constituted by a body (11) including the embedded electronics, ducted propellers (12), a landing gear (14) and a payload (13). A joystick-type two-crossed-axes sensor (15) allows measuring the inclination of the wire (2). The drone (1) is linked to the docking station (3) by a wire (2). The landing platform (32) is made of semi-rigid rubber, linked to the frame (31) by a deformable element (33) at the time of landing which is herein a cylinder. This cylinder is an active damping cylinder, that is to say that embedded electronics and a hydroelectric control of these cylinders allows damping shocks in a controlled manner. The cylinder is in the high position as long as the drone (1) is in flight. It is in the low position when it is desired to stow the drone in the docking station (3) and close the cowl (36) via its slides (37). The length of the wire (2) is controlled via a winding drum (34) of the wire (2).
Figure 2A:
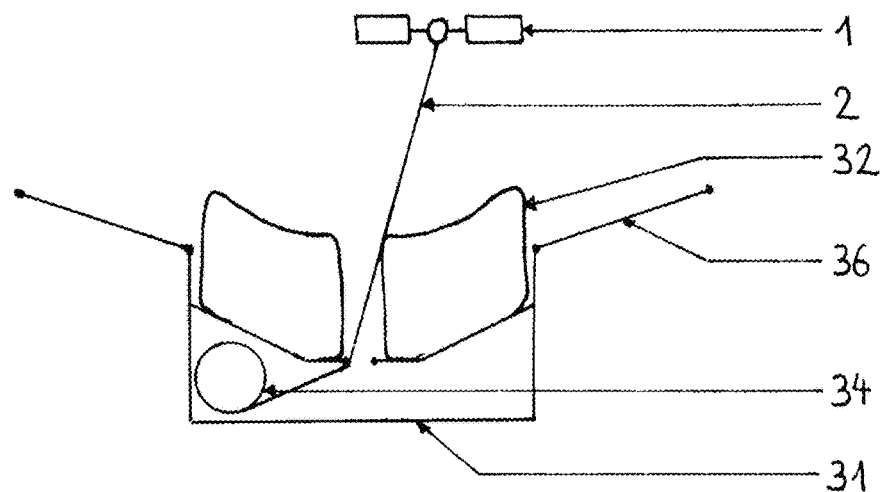
FIG. 2a represents a variant of the system according to the invention. It shows the drone (1) linked to the docking station (3) by a wire (2). The landing platform (32) is in the form of an air cushion. The cowl (36) is a double leaf cowl. When the drone (1) is in flight, the air cushion is inflated. When the docking station (3) has to be transported, the air cushion is deflated.
Figure 2B:
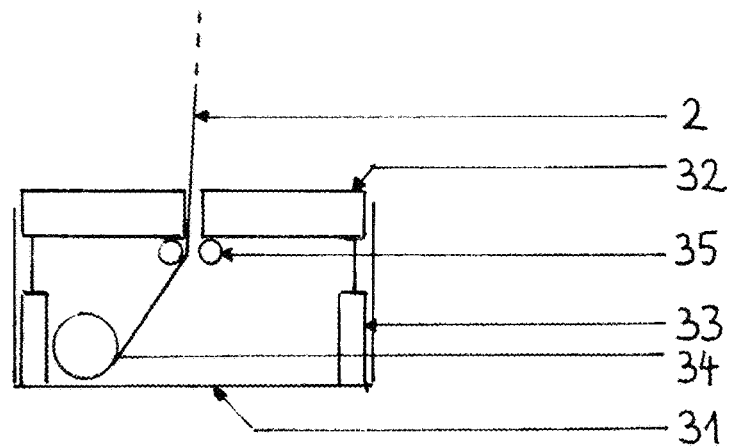
FIG. 2b represents another variant, where the landing platform (32) is flat and made of foam covered with a tight Teflon-coated canvas, on a cylinder (33).
Figure 2C:
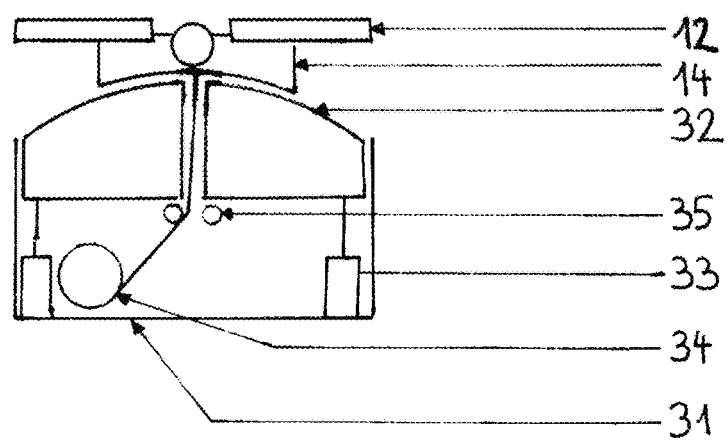
FIG. 2c represents another variant, where the landing platform (32) is made of foam, with a convex shape, and the landing gear (14) has a concave shape.

A preferred embodiment of the invention includes a drone (1), a wire (2), and a docking station (3). The entire system is in the form of a box which has as dimensions about 1.50 m by 1.50 m by 70 cm in height for a weight of about 50 kg.

The drone (1) includes four arms and two counter-rotating rotors per arm. The width of the drone (1) is about 1.20 m for a weight of about 5 kg, and for a payload (13) of 1 kg. The payload (13) is a recognition system including a high-resolution video sensor for day vision and a high-resolution infrared sensor for night vision. This payload (13) is of high value.

The docking station (3) includes a landing platform (32). The docking station (3) is powered by 48 V. The power of the drone (1) is about 2500 W. The drone (1) is powered by the wire (2), which passes through the center of the platform (32), and the wire (2) is wound on a winding drum (34) of the wire (2). The winding drum (34), well known to those skilled in the art, is disposed under the platform (32). The docking station (3) can be enclosed by a slide (37) cowl (36) device. When the docking station (3) is enclosed by its cowl (36), the wire (2) is maximally wound on the winding drum (34) and blocked thanks to a brake system, such that the drone (1) is pressed against the platform (32) and at the center of the platform (32). The box can be transported in all directions, vertically, upside down, without the drone (1) moving inside the box.

The platform (32) is constituted by a canvas stretched on the edges of the frame (31) by an elastic deformable element (33). The general shape of the platform (32) looks like a parabola section.

The drone (1) includes a landing body (14) constituted by arches made of a titanium-based alloy. These arches are deformable and allow damping shocks. The payload (13) is protected because it lies within the convex envelope formed by the assembly of the drone (1) and its landing body (14).

This drone (1) is used for surveillance missions. The docking station (3) can be loaded on all types of vehicles: land, sea and air vehicles.

The operator has a control device (100) including the following instructions: arming, take-off, altitude setting, horizontal relative position setting with respect to the docking station (3), landing, emergency landing, parachute, aggression, manual piloting.

When the operator places the drone (1) in the armed position, the drone (1) is powered via the wire (2). The electronic systems of the drone (1) and of the docking station (3) are started, so as to allow an immediate take-off.

Pressing on the take-off button causes the opening of the slide (37) cowl (36) and the immediate take-off of the drone (1) at a speed of about 3 m/s. The drone (1) reaches the altitude set in the system, adjustable between 3 m and 80 m, then the drone (1) displaces along a horizontal line up to the position determined by the user. The relative position of the drone (1) with respect to the docking station (3) is evaluated by the system by comparing the measurements of the positions of two embedded GPS systems or positioning sensor, one (39) on the drone (1), the other (38) on the docking station (3). When the vehicle, therefore the docking station (3) is moving, the drone (1) follows the docking station (3) thanks to a servo-control loop of the relative position of the drone (1) with respect to the docking station (3).

Pressing on the landing button triggers the normal landing procedure. The drone (1) returns at a constant altitude to right above the platform (32) then goes down at 3 m/s to a height of 3 m above the docking station (3), a priori while moving since the vehicle is moving. At this altitude, a radio positioning system on the docking station (3) locates the position of the drone (1) with an accuracy in the order of cm. Accelerometers (40) and anemometers (41) located on the drone (1) and located on the docking station (3) allow simulating in real-time the calculated landing position Pc of the drone (1), the calculated landing speed Vc, and the calculated uncertainty IPc on the landing position, these three variables being calculated according to several landing modes hypotheses, including the stoppage of the motors (42) of the drone (1). A score function Sc is calculated in real-time, providing a number all the more larger as the calculated position Pc is close to the center of the platform (32), the calculated speed Vc is low, and the uncertainty IPc is low. The score function Sc is compared with an acceptance threshold function Sa which decreases over time, and is considerably decreased if the aggression button has been initiated. When the value of Sc is greater than the value of Sa, the associated landing procedure is triggered.

When the emergency landing procedure is initiated, a procedure similar to the previous one is launched, but it is optimized in order to minimize the landing time.

The horizontal and vertical speeds are the maximum ones admissible for the drone (1). The score functions Sc and Sa are calculated differently, so that the landing takes place very quickly, by accepting in particular higher impact speeds.

When the parachute procedure is initiated, the electronic system evaluates, according to the anemometers, data from the accelerometers, whether it is still possible to place the drone (1) at the position that will enable it to fall directly onto the platform (32). If so, the drone (1) firstly moves at maximum speed to that position, then a parachute (44) is opened. Otherwise, the parachute is directly open, and the wire (2) exerts a pulling in the range of 15 kg on the drone (1), in order to bring the drone (1) back to the center of the platform (32).

If the flight parameters are critical, such as for example in case of a malfunction of a motor or of an embedded sensor, the drone (1) can trigger itself either one of the landing procedures.

At any time, unless the parachute is open, the operator can take manual control of the drone (1).

The system is designed to accept falls of the drone (1) at 15 m/s offset up to 70 cm from the center of the platform (32), while protecting the payload (13) and the entire drone (1). Nevertheless, if the fall takes place at more than 20 cm from the center of the platform (32), the arms of the drone (1) supporting the rotors can break. The drone (1) is therefore designed with quick-exchange removable arms. The shocks are damped at the center of the platform (32) thanks to the superposition of the damping effects by the elastic bands, designed to lengthen by about 15 cm for a landing speed of 10 m/s, the elasticity of the fabric used, and finally the landing body (14), which flatten by about 10 cm for this same falling speed. In all, a fall at 15 m/s is damped over a distance of 30 cm.

Once the landing is completed, the wire (2) exerts a pull in the range of 15 kg on the drone (1) which has the effect of replacing the drone (1) at the center of the platform (32), which is helped by the fact that the canvas is covered with Teflon, and that the coefficient of friction between the landing body (14) and the Teflon covered canvas is low. Then, the cowl (36) is closed by sliding in the slides (37).

According to a first variation of this embodiment of the invention, the canvas of the platform (32) is stretched over a square structure on cylinders. At the opening of the cowl (36), the square structure is raised by the cylinders, above the edges of the docking station (3), so that during a strongly decentered fall of the drone (1) on the docking station (3), the drone (1) does not hit the rigid edges of the docking station (3), but falls on the edges of the landing platform (32). The pressure in the cylinders is adjusted so that they damp a fall of the drone (1). The cylinders thus constitute a deformable element (33) linking the platform (32) to the frame (31), absorbing part of the impact energy during a fall of the drone. According to a variant of this first variation, the cylinders correct the attitude of the platform (32) in real-time, so that the platform (32) is always horizontal. According to a second variant of this first variation, the cylinders dynamically damp the impact of the drone (1) on the platform, according to techniques well known to those skilled in the art.

According to a second variation, the near-field positioning system is not made via a radio positioning system, but by a joystick-type two-crossed-axes sensor (15) located at the interface between the wire (2) and the drone (1). The joystick-type two-crossed-axes sensor (15) provides information on the inclination between the wire (2) and the drone (1), and the remoteness of the drone (1) is measured by measuring the length of the wire (2) unwound by the winder.

According to a third variation, smooth pads are integrated into the landing body (14) of the drone (1), which facilitates the slip of the drone (1) on the platform (32), in order to facilitate the repositioning of the drone (1) after landing. According to variants of this third variation:

1) after landing, a vibrator comes into contact with the platform (32) and makes the platform (32) vibrate, which has the effect of repositioning the drone (1) as close as possible to the center of the platform (32). An accuracy of 5 cm has been obtained.

2) after landing, the motors of the drone (1) are switched on and off with a period in the range of one second so as to generate small jumps of the drone (1) and the latter naturally returns by gravity to the center of the platform (32). It is also possible to automatically generate small flights of the drone (1) controlled by the embedded system so that the drone (1) returns to the center of the platform (32).

3) the entire platform (32) is mounted on cylinders and these cylinders can modify the orientation of the nacelle and generate jolts.

According to a fourth variation, the landing platform (32) is a rubber surface attached via springs to a metal framework mounted on cylinders. When the drone (1) is in flight, the platform (32) is in the high position, so that the platform (32) exceeds the edges of the docking station (3). The pressure in the cylinders in the high position, the springs, and the entire platform (32) have been adjusted experimentally, so that, during a fall of the drone (1) from a height of 10 m, the maximum resulting acceleration at the level of the drone (1) is sufficiently contained so that this fall from 10 m can be repeated a large number of times without damage to the drone (1) and the payload (13). The platform (32) of this variation is 2 m in diameter. In this variation, the landing platform (32) is covered with Teflon, has a concave shape, has a radius of curvature of 5 m. The rubber used deforms little under the effect of the weight of the drone (1) alone, such that, when the drone (1) is positioned on the edge of the platform (32), it returns by slipping to the center of the platform (32), because of the concave geometry of the platform (32) and the low coefficient of friction between the Teflon and the landing body (14) of the drone (1). The tests have led our drone (1) to be systematically repositioned without pulling on the wire (2), at a distance less than 5 cm from the center of the platform (32), and with a pull on the wire (2), at a distance less than 1 cm from the center of the platform (32).

According to a fifth variation, the landing procedures provide for controlling the lateral position of the drone (1), while the rescue parachute is open and the drone (1) falls, slowed down by the open parachute. In this variation, the lateral position is controlled via the speeds of the propellers (12). The purpose is then to recenter the drone (1) above the platform (32). Several degraded conditions are expected: losses of one or several lift rotor(s), losses of a particular sensor.

According to a sixth variation, the landing procedure provides for setting the motors of the drone (1) at maximum speed, and the return of the drone (1) on the platform (32) is ensured by pulling the wire (2) on the drone (1). Such a procedure allows dispensing with relative movements of the platform (32) of the drone (1), measurements of the relative positions of the drone (1) with respect to the platform (32), or wind gusts.

POSSIBILITIES OF INDUSTRIAL APPLICATIONS

The system according to the invention is particularly intended for the automation of the landing for all wired drones (1), particularly when it is provided that the drone (1) can land:
  in heavy wind,
  on moving vehicles,
  in degraded flight conditions of the drone (1) such as the loss of a rotor,
  for receiving the drone (1) after opening the emergency parachute,
  very quickly in case of aggression, at speeds close to free fall.

The invention claimed is:

1. A system including:
   a drone, the drone having propellers and motors;
   a docking station, the docking station having a landing pad and a frame, the landing pad being movable relative to the frame, wherein the landing pad is deformable or a deformable element connects the landing pad to the frame, wherein the landing pad is deformable during a landing of the drone on the landing pad such that under an effect of an impact during a landing of the drone, the deformable element takes up part of an impact energy of the drone;
   a wire connecting the drone to the docking station;
   a drum for winding the wire;
   at least one positioning sensor of the drone and at least one positioning sensor of the docking station;

at least one accelerometer sensor on the drone and at least one accelerometer sensor on the docking station;

at least one anemometric sensor on the drone and at least one anemometric sensor on the docking station;

a control device programmed to servo-control a position of the drone relative to the docking station, and to servo-control a pitch attitude of the drone, as a function of measurements from the at least one positioning sensor of the drone, the at least one positioning sensor of the docking station, the at least one accelerometer sensor on the drone, the at least one accelerometer sensor on the docking station, the at least one anemometric sensor on the drone and the at least one anemometric sensor on the docking station, the system being configured, during a landing phase, to:

i) stop the servo-control of the position of the drone relative to the docking station, ii) control a thrust of the propellers greater than a weight of the drone, iii) control a servo-control of the pitch attitude of the drone, iv) control a pull on the wire with the winding drum of the wire to bring the drone back to the landing pad, the system being such that the landing pad has a convex shape, that the drone has a landing body, and that this landing body has a concave shape.

2. The system according to claim 1, wherein the system is configured to stop the motors of the drone in flight, the landing ending with a fall of the drone on the landing pad.

3. The system according to claim 2, wherein the system includes a parachute and that the system is configured, in the presence of a malfunction of at least one of the motors of the drone or a malfunction of at least one of: the at least one positioning sensor of the drone, the at least one positioning sensor of the docking station, the at least one accelerometer sensor on the drone, the at least one accelerometer sensor on the docking station, the at least one anemometric sensor on the drone and the at least one anemometric sensor on the docking station, to:

automatically deploy the parachute, and/or continue to use the motors to help the drone to fall into the landing pad.

4. The system according to claim 3, further including a device for recentering the drone and configured to be implemented once the drone has landed, the device involving at least pulling on the drone via the wire and:

vibrating the landing pad after landing, or switching on and off of the motors of the drone.

5. The system according to claim 2, further including a device for recentering the drone and configured to be implemented once the drone has landed, the device involving at least pulling on the drone via the wire.

6. The system according to claim 1, further including a device for recentering the drone and configured to be implemented once the drone has landed, the device involving at least pulling on the drone via the wire.

7. The system according to claim 1, wherein the system includes a parachute and that the system is configured, in the presence of a malfunction of at least one of the motors of the drone or a malfunction of at least one of: the at least one positioning sensor of the drone, the at least one positioning sensor of the docking station, the at least one accelerometer sensor on the drone, the at least one accelerometer sensor on the docking station, the at least one anemometric sensor on the drone and the at least one anemometric sensor on the docking station, to:

automatically deploy the parachute, and/or continue to use the motors to help the drone to fall into the landing pad.

8. The system according to claim 7, further including a device for recentering the drone and configured to be implemented once the drone has landed, the device involving at least pulling on the drone via the wire and:

vibrating the landing pad after landing, or switching on and off of the motors of the drone.

\* \* \* \* \*